Feb. 16, 1943.                    R. C. LASSIAT                   2,310,962
                          CONTACT TREATMENT OF FLUIDS
                              Filed April 20, 1939              2 Sheets-Sheet 2

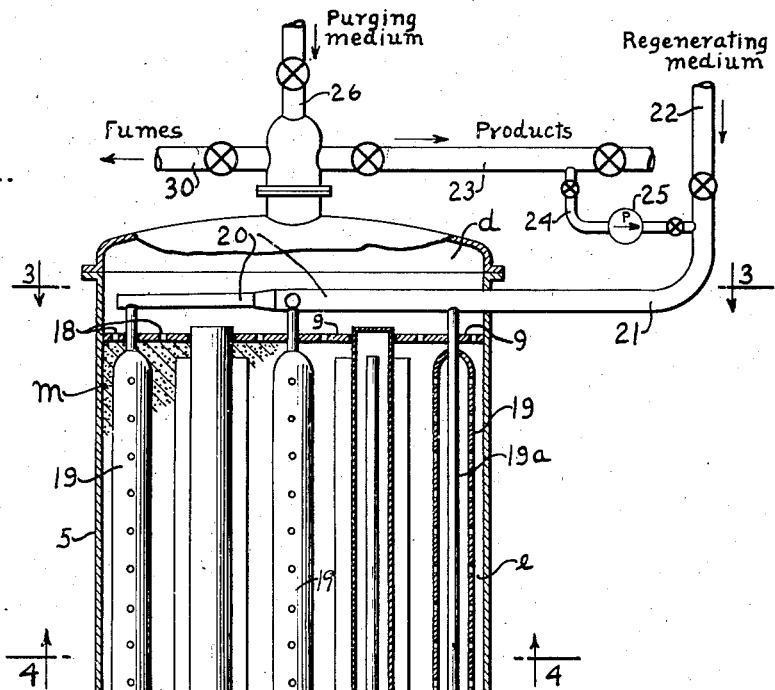
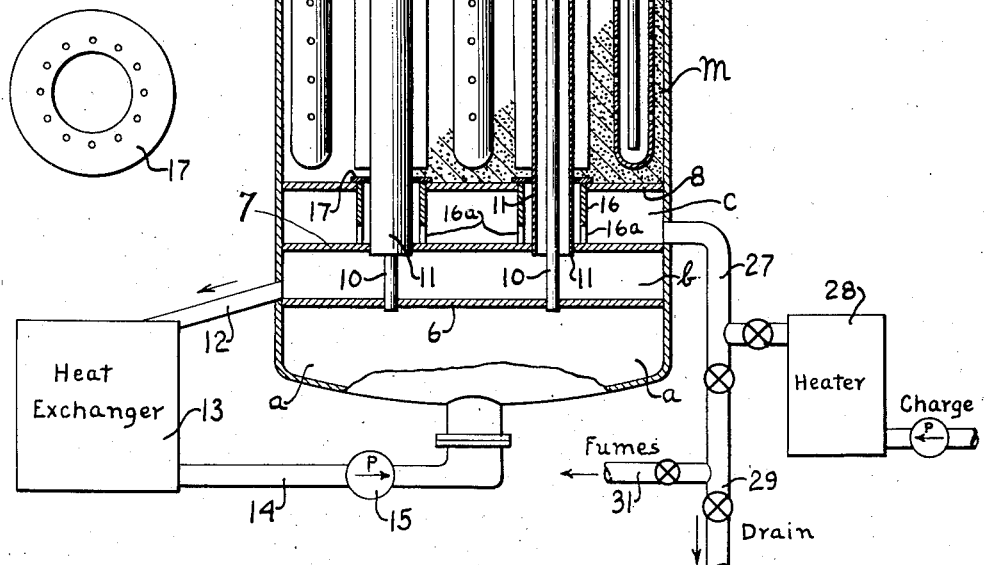

INVENTOR.
RAYMOND C. LASSIAT
BY
*Ira L. Nickerson*
ATTORNEY.

Patented Feb. 16, 1943

2,310,962

UNITED STATES PATENT OFFICE 2,310,962

CONTACT TREATMENT OF FLUIDS

Raymond C. Lassiat, Swarthmore, Pa., assignor to Houdry Process Corporation, Wilmington, Del., a corporation of Delaware Application April 20, 1939, Serial No. 269,052

18 Claims. (Cl. 23—288)

This invention relates to processes of and apparatus for the treatment of fluids in the presence of solid contact material which promotes or in any manner facilitates the desired operation. More particularly, it is concerned with the use of a contact mass which becomes poisoned or contaminated by a burnable deposit during the on-stream operation or treatment, which deposit must be removed from time to time, as by oxidation, to restore the mass to suitable condition for further on-stream operations. By preference, the regeneration is effected without removing the contact material from the reaction chamber.

One object of the invention is to devise improved ways and means for effecting contacting operations. Another object is to maintain efficient temperature control of the reaction zone during both on-stream and regenerating reactions. Still another object is to improve converter design and construction. Still other objects will be apparent from the detailed description which follows.

The invention provides for a deep bed of solid contact material and for straight-through flow of on-stream reactants, while arranging for convenient and rapid regeneration of the contact material in place when desired or required. By preference, the regenerating medium is distributed within the bed of contact material by a series of perforated conduits or distributing units and the products or fumes of regeneration are vented from either or both ends of the bed. Straight-through flow of on-stream reactants is insured by sending a suitable blocking fluid into the perforated conduits. While process fluid may be used for this purpose, blocking is preferably effected by recycling, by means of the perforated conduits, a part only, and often a very small part, as 10% or less, of the products of the on-stream reaction. Other aspects of the invention involve apparatus details relating to mounting of conduits, movement of fluids, and arrangements for temperature control in catalytic converters.

In order to illustrate the invention and the manner of its use, one concrete embodiment thereof is shown in the accompanying drawings, in which:

Fig. 1 is a view somewhat diagrammatic in character, showing a chemical converter partly in elevation, and partly in vertical section on the zigzag line 1—1 of Fig. 4;

Fig. 2 is a plan view of a detail of Fig. 1;

Figure 3:
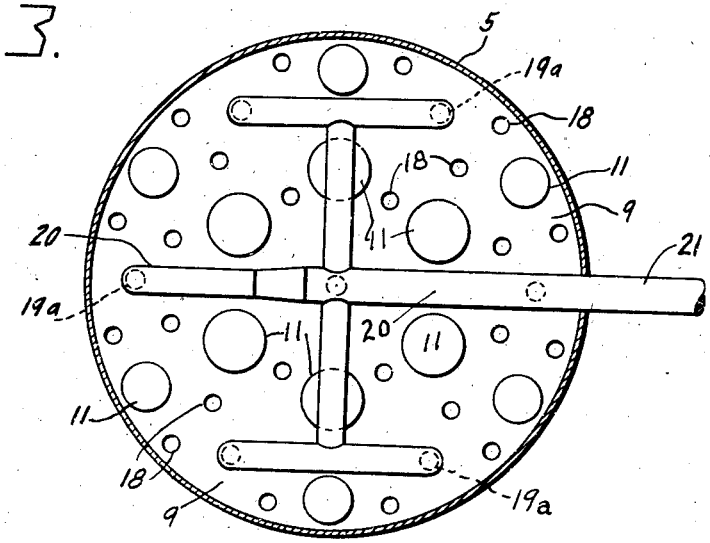
Fig. 3 is a transverse sectional view substantially on the line 3—3 of Fig. 1.

The interior of the converter 5 is divided by transverse partitions or tube sheets 6, 7, 8 and 9 into manifolding chambers $a$, $b$, $c$ and $d$ and a large reaction chamber $e$ adapted to be filled with a deep bed of solid contact material M. Chambers $a$ and $b$ are, respectively, inlet and outlet manifolding chambers for an extraneous heat exchange medium for regulating the temperature of mass M in reaction chamber $e$. To provide for the mounting of heat exchange members, partitions 6, 7 and 8 have aligned apertures of progressively increasing size toward reaction chamber $e$. Small conduits 10, open at both ends, are mounted in the openings in partition 6 and extend in nested telescoping relation through the lower open ends of larger conduits 11, which are mounted in the openings in partition 7. Conduits 11 extend entirely through reaction chamber $e$, and their upper closed ends may be received in guide openings in partition 9. The reverse flow units 10, 11 thus provide for flow of heat exchange fluid from manifolding chamber $a$ to the top of the reaction chamber $e$ through pipe 10, back through pipe 11 to manifolding chamber $b$, and the rest of the heat exchange circuit is made up of connection 12 to heat exchanger 13 and connection 14 containing pump 15 which sends the fluid back into manifolding chamber $a$. Any suitable fluid may be used as the heat exchange medium, such as water, mercury, diphenyl, low melting metals and alloys, fused salts, etc.

Manifolding chamber $c$ is for entering reactants and communicates with reaction chamber $e$ through sleeve members 16 having apertures 16$a$, the sleeve members being secured in the openings in partition 8 and extending in spaced encircling relation with outer conduits 11 of the heat exchange units to partition 7. In this way, sleeve members 16 unite partitions 7 and 8 into a stiff structure capable of supporting the weight of contact mass M and of the outer heat exchange members 11, which are usually finned to effect more thorough heat exchange with contact mass M. At the same time, the number of openings through partition 8 is reduced, since the space between heat exchange conduits 11 and sleeve members 16 is utilized for the passage of reactants. A slotted or perforated slip ring or disk 17 (Figs. 1 and 2) loosely encircles each of outer conduits 11 below the fins thereon and rests upon partition 8 to keep contact mass M from entering the space between sleeve members 10 and outer conduits 11. The reaction products pass from reaction chamber e into top manifolding chamber d through perforations 18 in partition 9, which may be provided in addition to any openings therein for receiving or guiding conduits, such as the tops of heat exchange conduits 11.

For the purpose of effecting speedy regeneration of contact mass M after the latter has been poisoned or lost its ability to promote the on-stream reaction, means are provided for distributing a regenerating fluid within and throughout the interior of mass M. Such means may take the form of apertured conduits 19 extending into reaction chamber e, to be embedded in contact mass M in interspersed relation with the heat exchange units 10, 11. While single tubes may be utilized, it is preferable, for the maintenance of substantially uniform temperature conditions throughout mass M, to provide nested units made up of the outer perforated conduit 19 and an inner supply conduit 19a. Inner conduits 19a extend through openings therefor in partition member 9, and are connected to a branched manifold 20 disposed in manifolding chamber d and supplied from an external source by supply pipe 21. During regenerating periods, a regenerating medium, which may be air or any other suitable oxidizing medium, if the regeneration is to be effected by burning, may be sent to supply line 21 by valved branched line 22.

Since on-stream reactions in the present converter are to be effected by straight-through passage of reactants from manifolding chamber c to manifolding chamber d, it is desirable, in order to insure completion of the reaction and proper yields, to avoid possible short-circuiting of reactants from having the same pass from mass M into the lower end of perforated regenerating conduits 19 and then issue from the latter toward the top of the reaction chamber so as to pass through only a small depth of catalyst, rather than through the full depth of the bed of catalyst disposed in reaction chamber e. To prevent such short-circuiting, a blocking fluid is sent into perforated distributing conduits 19 in limited amount and under sufficient pressure to balance or to exceed the pressure obtaining within the reaction chamber, so that, if there is any movement of fluid through the perforations in conduits 19, it will be outwardly into mass M, rather than inwardly into conduits 19. Any suitable or desired fluid may be used as blocking fluid, as, for example, process fluids like steam, inert gas, refinery gas either wet or lean, hydrogen, etc. By preference, however, the blocking fluid consists of products of the on-stream reaction. To this end, products line 23, leading from the top of the converter, is tapped, as by valved branched line 24, which is provided with suitable pumping or impelling means 25 and is connected to supply line 21 for conduits 19. The quantity of products thus diverted for recycling as blocking fluid through distributing conduits 19 ordinarily will not exceed 10% of the products of the on-stream operation. Usually, an amount of the order of 5% is ample.

When the on-stream operation is stopped in order to restore or reactivate the contact mass or catalyst M, it is important to purge the converter in order to recover reactants and reaction products remaining therein and also to avoid any danger of explosion when the regenerating medium is admitted. To this end, the top of the converter has a connection 26 for the admission of any suitable purging medium, liquid or gaseous, and the converter and connections are arranged to drain so that pockets of fluid will not be left at any point. Hence distributing conduits 19 have drain openings in the lower ends thereof, as indicated, and the apertures 16a in sleeves 16 are closely adjacent partition 7, as shown. Moreover, supply line 27 for reactants slopes downwardly to drain 29 with a valved connection to heater 28 for the charge. Evacuation of the converter, in whole or in part, may be effected, if desired, by applying a vacuum through drain 29. During regenerating periods, the regenerating medium is distributed all through the mass by perforated conduits 19, and the fumes or reaction products may escape from the top of the converter through fume connection 30, or from the bottom of the converter through connection 31 above drain 29, or from both ends of the reaction chamber through both these connections.

Figure 4:
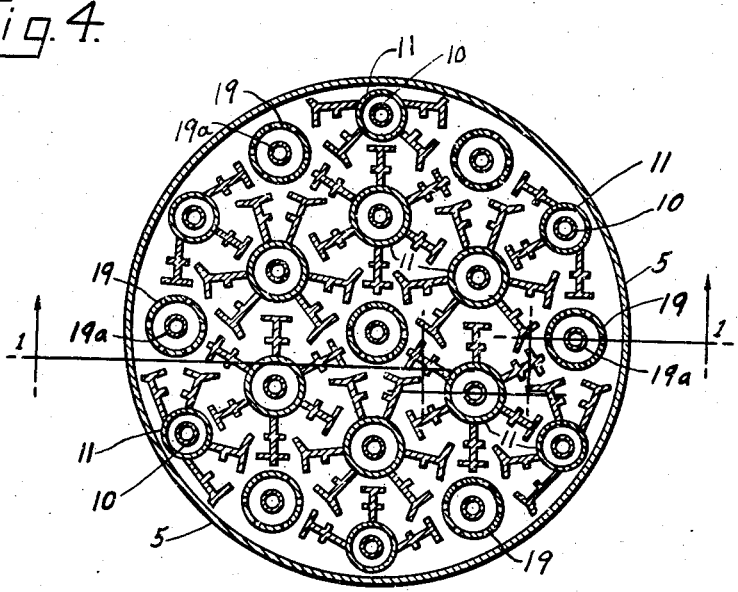
Fig. 4 is a transverse sectional view on the line 4—4 of Fig. 1.

The distribution of reactants for the regenerating operation and the means for regulating the temperature of the entire bed of contact material is illustrated by Figs. 1 and 4. In the particular form of the invention shown, the regenerating medium is admitted by a distributing conduit 19 located in the center of the bed and by additional conduits distributed uniformly around the periphery of the reaction chamber, with heat exchange elements 10, 11 symmetrically grouped around the central distributing member 19 and between the marginal distributing members. Axial fins extend radially from the outer conduits of all of the heat exchange elements in a manner to conduct heat to or remove heat from all parts of the bed of contact material as may be required by the nature and intensity of the reaction. Alternate heat exchange elements 10, 11 have the same arrangement of fins, the outer conduit 11 of one element having T-shaped fins grouped in three pairs of two fins each, each pair of fins having short extensions intermediate their length projecting generally toward each other, while the fins on the next adjacent outer conduit 11 are six in number, equally spaced, with a wide cross member at the extremity of the fin and a shorter cross member halfway of the fin. The alternate heat exchange elements 10, 11 are then positioned, as indicated in Fig. 4, so that certain of the equally spaced fins of one element are received between adjacent pairs of fins on the next or alternate heat exchange element. The heat exchange elements near the periphery of the reaction chamber have fewer fins than those completely embedded in the contact material, those having their fins in pairs losing one pair, while those with equally spaced fins lose three fins.

The invention is of value whenever a long path of flow through contact material in a deep bed is desired or required, regardless of whether the reaction is effected in vapor phase or in liquid phase. However, it is of special importance in liquid phase operations, due to the substantial pressure drop between the inlet for reactants and the outlet for reaction products, which tends to promote short-circuiting through the bed. The invention is capable of general application, and has a wide range of use. For example, it has been used to advantage in the liquid phase polymerization of hydrocarbon gases containing unsaturates to produce liquid motor fuels, the reaction being conducted at pressures up to 700 lbs. per square inch and below the critical temperature of the charge, as from 50° to about 300° F. and in the presence of active blends or compounds of silica and alumina as set forth in the copending application of E. J. Houdry and J. P. Daugherty, Jr., Serial No. 239,632, filed November 9, 1938 (Patent No. 2,273,038, issued February 17, 1942). Another exemplary use of the invention is in the production of Bunker C fuels from tarry and asphaltic residues effected in the temperature range of 775° F. to 875° F., under pressure of 100 lbs. per square inch or more, with the aid of porous contact material having little or no catalytic activity, the operation being conducted so as to produce only a small quantity of naphtha as disclosed in the copending application of E. J. Houdry and A. G. Peterkin, Serial No. 256,710, filed February 16, 1939. In both operations, up to 10% and usually from 4 to 7% of the liquid products is fed back into distributing conduits 19 as blocking fluid. Both these exemplary reactions produce burnable deposits on the contact masses, and regeneration of the same is preferably effected by oxidation in known manner. Air is a convenient and cheap oxidizing medium and the contact mass is allowed to rise sufficiently in temperature to burn away the deposit, the heat exchange medium being utilized to hold the reaction in bounds so as not to injure the contact mass or the converter. Flushing the reaction chamber with water or other suitable solvents may be effected from time to time as a substitute for oxidation or to remove salts or other deposits which resist oxidation. For continuous operation, two or more converters will be utilized in known manner.

While the invention has been herein disclosed in connection with what are now considered to be certain preferred aspects, it is to be understood that it is not limited to such preferred forms but covers all variations, modification and adaptations within the scope of the appended claims.

I claim as my invention:

1. In the operation of a catalytic converter which is provided with perforated tubes embedded in the catalyst mass for the purpose of distributing fluid within the latter, the step of feeding a fluid inert to the reactants into the perforated tubes while passing the reactants through the catalyst mass from end to end, the inert fluid being fed in an amount sufficient to keep the reactants from entering the tubes through the perforations in the latter.

2. In the operation of converters charged with a deep bed of solid contact material for promoting chemical reactions in which on-stream reactions alternate with regenerating reactions to restore the contact material to condition to promote the desired reaction and in which perforated conduits are disposed within the bed of contact material for distribution of fluid within and throughout the contact material, the process steps of passing the on-stream reactants through the bed from end to end during on-stream reactions, distributing the regenerating fluid by means of the aforesaid conduits within said bed during regenerating reactions, and feeding a blocking fluid in restricted quantity to said conduits during on-stream reactions.

3. In the operation of converters charged with a deep bed of solid contact material for promoting chemical reactions in which on-stream reactions alternate with regenerating reactions to restore the contact material to condition to promote the desired reaction and in which perforated conduits are disposed within the bed of contact material for distribution of fluid within and throughout the contact material, the process step of feeding fluid to said bed through said conduits during both on-stream and regenerating reactions, a regenerating fluid in substantial amount during regenerating reactions and a blocking fluid in small amount during on-stream reactions.

4. In the operation of a converter containing a deep bed of solid contact material for effecting a desired on-stream reaction in alternation with a regenerating reaction to restore the activity of the contact material, perforated conduits being embedded in the contact material in symmetrical arrangement for the distribution of fluid within and throughout said bed, the process steps of sending the reactants through the contact material from end to end during the on-stream reaction periods and at the same time sending into said perforated conduits a sufficient quantity of substantially inert fluid to restrict or to prevent entrance of said reactants into said perforated conduits.

5. In the operation of a converter containing a deep bed of solid contact material for effecting a desired on-stream reaction in alternation with a regenerating reaction to restore the activity of the contact material, perforated conduits being embedded in the contact material in symmetrical arrangement for the distribution of fluid within and throughout said bed, the process steps of sending the reactants through the contact material from end to end during the on-stream reaction periods and at the same time sending into said perforated conduits a sufficient quantity of fluid comprising up to ten per cent of the products of the on-stream reaction to restrict or to prevent entrance of said reactants into said perforated conduits.

6. In the operation of a converter containing a deep bed of solid contact material for effecting a desired on-stream reaction in alternation with a regenerating reaction to restore the activity of the contact material, imperforate and perforated conduits being embedded in the contact material in symmetrical arrangement, the imperforate conduits being for temperature regulation of the contact material and the perforated conduits for distribution of fluid within and throughout said bed, the process steps of sending the reactants during on-stream periods through said bed from end to end, during the same on-stream periods sending into said perforated conduits a blocking medium in sufficient quantity to exclude on-stream reactants from said conduits, during regenerating periods sending the regenerating medium into said perforated conduits for distribution within and throughout said bed, and utilizing a heat exchange medium in said imperforate conduits to regulate the temperature of the contact material during the alternate reaction periods.

7. In the operation of a converter containing a deep bed of solid contact material for effecting a desired on-stream reaction in alternation with a regenerating reaction to restore the activity of the contact material, imperforate and perforated conduits being embedded in the contact material in symmetrical arrangement, the imperforate conduits being for temperature regulation of the contact material and the perforated conduits for distribution of fluid within and throughout said bed, the process steps of sending the reactants during on-stream periods through said bed from end to end, during the same on-stream periods sending into said perforated conduits a blocking medium comprising up to 10% of products of the on-stream operation to prevent short-circuiting of on-stream reactants through said perforated conduits, during regenerating periods sending the regenerating medium into said perforated conduits for distribution within and throughout said bed, and utilizing a heat exchange medium in said imperforate conduits to regulate the temperature of the contact material during the alternate reaction periods.

8. A converter providing a reaction chamber adapted to be filled with a bed of solid contact material, inlet and outlet means for reactants and reaction products arranged to effect straight-through flow of fluid in said reaction chamber, heat exchange members in said reaction chamber for controlling the temperature of said bed of contact material, perforated conduits in said reaction chamber for distributing fluid within said bed of contact material, and valved means connecting said perforated conduits to said outlet means and to an independent source of fluid.

9. A converter providing a reaction chamber adapted to be filled with a bed of solid contact material, inlet and outlet means for reactants and reaction products arranged to effect straight-through flow of fluid in said reaction chamber, heat exchange members in said reaction chamber for controlling the temperature of said bed of contact material, perforated conduits in said reaction chamber for distributing fluid within said bed of contact material, means including a valved connection and pumping equipment for sending back reaction products through said perforated conduits into said reaction chamber, and another connection to said perforated conduits for supplying extraneous fluid thereto.

10. A converter having adjacent one end thereof three partitions extending thereacross in spaced parallel relation forming as many manifolding chambers and a reaction chamber beyond the inmost of said partitions adapted to be filled with solid contact material, said partitions having aligned opening of progressively increasing size toward said reaction chamber, conduits with closed ends disposed in said reaction chamber and extending loosely through the openings in said inmost partition and having open ends secured in the openings in the second of said partitions, smaller conduits with open ends mounted in the openings in the first or outmost of said partitions and extending in nested telescoping relation within said first named conduits whereby heat exchange fluid admitted to the first manifolding chamber passes into said smaller conduits, thence into the outer of said nested conduits and thence into said second manifolding chamber, and apertured sleeves secured in the openings of said inmost partition and extending to said second partition in spaced encircling relation with the outer of said nested conduits to provide communication between said reaction chamber and said third manifolding chamber.

11. A converter having adjacent one end thereof three partitions extending thereacross in spaced parallel relation forming as many manifolding chambers and a reaction chamber beyond the inmost of said partitions adapted to be filled with solid contact material, said partitions having aligned openings of progressively increasing size toward said reaction chamber, conduits with closed ends disposed in said reaction chamber and extending loosely through the openings in said inmost partition and having open ends secured in the openings in the second of said partitions, smaller conduits with open ends mounted in the openings in the first or outmost of said partitions and extending in nested telescoping relation within said first named conduits whereby heat exchange fluid admitted to the first manifolding chamber passes into said smaller conduits, thence into the outer of said nested conduits and thence into said second manifolding chamber, apertured sleeves secured in the openings of said inmost partition and extending to said second partition in spaced encircling relation with the outer of said nested conduits to provide communication between said reaction chamber and said third manifolding chamber, and means at said inmost partition for keeping contact material from entering said sleeves.

12. A converter, a partition within said converter separating a reaction chamber from a manifolding chamber, said partition having openings of substantial size therethrough, said reaction chamber being adapted to be filled with solid contact material and said manifolding chamber to supply reactant fluid to said reaction chamber, conduits for heat exchange fluid extending through said manifolding chamber and loosely through the openings in said partition and into said reaction chamber to regulate the temperature of the contact mass therein, apertured sleeve members extending across said manifolding chamber in spaced encircling relation with said conduits and secured in the openings in said partition to cause fluid passing between said manifolding chamber and said reaction chamber to remain close to said conduits, and means encircling said conduits at said openings in said partition to permit passage of fluid but to prevent contact material from entering said sleeve members.

13. A converter, a partition within said converter separating a reaction chamber from a manifolding chamber, said partition having openings of substantial size therethrough, said reaction chamber being adapted to be filled with solid contact material and said manifolding chamber to supply reactant fluid to said reaction chamber, conduits for heat exchange fluid extending through said manifolding chamber and loosely through the openings in said partition and into said reaction chamber to regulate the temperature of the contact mass therein, apertured sleeve members extending across said manifolding chamber in spaced encircling relation with said conduits and secured in the openings in said partition to cause fluid passing between said manifolding chamber and said reaction chamber to remain close to said conduits, and apertured disks slidable on said conduits and disposed adjacent said partition to keep contact material from entering said sleeve members while permitting passage of fluid.

14. A converter providing a reaction chamber containing a mass of solid contact material, means for admitting reactants to said reaction chamber and for withdrawing reaction products therefrom and imperforate conduits embedded in said mass for regulating the temperature thereof, said conduits comprising two groups, the conduits of one group having axial fins disposed in pairs with the pairs in symmetrical arrangement therearound and the conduits of the other group having single fins equally spaced projecting therefrom, the conduits of both groups being so arranged that the single fins of one group extend into the spaces between the pairs of fins on the other group whereby heat may be conducted to or removed from all parts of said mass in a substantially uniform manner by said conduits.

15. A converter providing a reaction chamber adapted to be filled with solid contact material, inlet and outlet means for reactants and reaction products arranged to effect straight-through flow of fluid in said reaction chamber, perforated conduits in said reaction chamber for distributing fluid within said bed of contact material, valved means connecting said perforated conduits to said outlet means and to an independent source of fluid, and heat exchange conduits extending into said reaction chamber in interspersed relation with said perforated conduits for temperature control of the reaction, said conduits comprising two groups, the conduits of one group having axial fins disposed in pairs with the pairs in symmetrical arrangement therearound and the conduits of the other group having single fins equally spaced projecting therefrom in symmetrical arrangement, the conduits of both groups being so arranged that the fins thereon extend substantially uniformly into all parts of the reaction chamber not occupied by said perforated conduits and with single fins of one group extending into spaces between pairs of fins on the other group.

16. A converter providing a reaction chamber for containing a deep bed of solid contact material, apertured partitions defining the ends of said reaction chamber and separating the same from adjacent manifolding chambers, perforated conduits for distributing fluid and imperforate conduits for temperature control extending into said reaction chamber in interspersed symmetrical arrangement, one perforated conduit being disposed centrally of said reaction chamber with the other conduits disposed in annular series outwardly thereof, the first annular series comprising imperforate temperature control conduits only and the second series comprising both perforated distributing conduits and imperforate temperature conduits in alternation, said imperforate temperature control conduits having fins radiating therefrom to effect substantially uniform temperature control of all parts of said reaction chamber.

17. A converter providing a reaction chamber for containing a deep bed of solid contact material, apertured partitions defining the ends of said reaction chamber and separating the same from adjacent manifolding chambers, perforated conduits for distributing fluid and imperforate conduits for temperature control extending into said reaction chamber in interspersed symmetrical arrangement, one perforated conduit being disposed centrally of said reaction chamber with the other conduits disposed in two annular series enclosing the same, the first or inner annular series comprising imperforate temperature control conduits only and the second or outer annular series comprising both perforated distributing conduits and imperforate temperature control conduits in alternation, said imperforate temperature control conduits having axial fins radiating therefrom with transverse extensions arranged so as to effect substantially uniform temperature control of all parts of said reaction chamber.

18. A converter providing a reaction chamber for containing a deep bed of solid contact material, apertured partitions defining the ends of said reaction chamber and separating the same from adjacent manifolding chambers, perforated conduits for distributing fluid and imperforate conduits for temperature control extending into said reaction chamber in interspersed symmetrical arrangement, one perforated conduit being disposed centrally of said reaction chamber with the other conduits disposed in two annular series enclosing the same, the first or inner annular series comprising imperforate temperature control conduits only and the second or outer annular series comprising both perforated distributing conduits and imperforate temperature control conduits in alternation, said imperforate temperature control conduits having axial fins radiating therefrom with transverse extensions arranged so as to effect substantially uniform temperature control of all parts of said reaction chamber, said imperforate conduits comprising two groups, each group supplying alternate imperforate members for both said annular series of conduits, the imperforate conduits of one group having their axial fins disposed in pairs symmetrically disposed therearound and the imperforate conduits of the other group having single fins equally spaced projecting therefrom, the imperforate conduits of both groups being so disposed that single fins of one group extend into spaces between pairs of fins of the other group.

RAYMOND C. LASSIAT.